(12) United States Patent
Olgaard

(10) Patent No.: US 7,519,383 B2
(45) Date of Patent: Apr. 14, 2009

(54) METHOD FOR EFFICIENT CALIBRATION OF EVM USING COMPRESSION CHARACTERISTICS

(75) Inventor: Christian Olgaard, Sunnyvale, CA (US)

(73) Assignee: LitePoint Corp., Sunnyvale, CA (US)

( * ) Notice: Subject to any disclaimer, the term of this patent is extended or adjusted under 35 U.S.C. 154(b) by 632 days.

(21) Appl. No.: 11/160,673

(22) Filed: Jul. 5, 2005

(65) Prior Publication Data
US 2007/0009021 A1 Jan. 11, 2007

(51) Int. Cl.
H04B 7/00 (2006.01)
(52) U.S. Cl. ............ 455/522; 455/91; 455/115.1; 455/552.1; 455/78; 455/127.4; 455/132; 370/333; 370/318; 375/224; 375/260
(58) Field of Classification Search ............ 455/91, 455/115.1, 552.1, 78, 127.4, 132, 522; 375/224, 375/260; 370/333, 318
See application file for complete search history.

(56) References Cited

U.S. PATENT DOCUMENTS

| | | | |
|---|---|---|---|
| 6,904,110 B2 * | 6/2005 | Trans et al. .............. 375/350 |
| 6,922,549 B2 * | 7/2005 | Lyons et al. ............ 455/67.13 |
| 7,085,544 B2 * | 8/2006 | Takano et al. ............. 455/102 |
| 7,110,724 B1 * | 9/2006 | Epperson et al. ............. 455/72 |
| 7,139,536 B2 * | 11/2006 | Chiu .................... 455/115.1 |
| 7,299,021 B2 * | 11/2007 | Parssinen et al. ......... 455/226.1 |
| 7,313,373 B1 * | 12/2007 | Laskharian et al. ....... 455/127.1 |
| 7,333,780 B2 * | 2/2008 | Udagawa et al. ............ 455/126 |
| 2002/0113905 A1 * | 8/2002 | Lee ........................... 348/724 |
| 2003/0012289 A1 * | 1/2003 | Lindoff ...................... 375/262 |
| 2003/0104792 A1 | 6/2003 | Doi |
| 2004/0095995 A1 * | 5/2004 | Matreci et al. .............. 375/224 |
| 2004/0106380 A1 * | 6/2004 | Vassiliou et al. .............. 455/73 |
| 2004/0137856 A1 * | 7/2004 | Kanazawa et al. ............ 455/91 |
| 2004/0187070 A1 | 9/2004 | LaBerge |
| 2005/0069026 A1 * | 3/2005 | Vepsalainen et al. ........ 375/219 |
| 2005/0180359 A1 * | 8/2005 | Seals et al. .................. 370/333 |
| 2006/0066394 A1 * | 3/2006 | Eckl et al. ...................... 330/2 |
| 2006/0183432 A1 * | 8/2006 | Breslin et al. ................ 455/69 |
| 2007/0053463 A1 * | 3/2007 | Hara ......................... 375/295 |

OTHER PUBLICATIONS

International Search Report for PCT/US06/25334, dated Mar. 4, 2008, 3 pages.
Written Opinion for PCT/US06/25334, dated Mar. 4, 2008, 3 pages.

* cited by examiner

Primary Examiner—Duc Nguyen
Assistant Examiner—Amar Daglawi
(74) Attorney, Agent, or Firm—Vedder Price P.C.

(57) ABSTRACT

A method for estimating and measuring error vector magnitude (EVM) is provided by correlating a transmitter compression level to an EVM.

15 Claims, 8 Drawing Sheets

METHOD FOR EFFICIENT CALIBRATION OF EVM USING COMPRESSION CHARACTERISTICS

FIELD OF THE INVENTION

The present invention relates generally to calibration and testing of a transmitter or data packet signal generator and more particularly, to time efficient adjustment of error vector magnitude (EVM) for more optimal calibration and performance of the data packet signal generator. The terms transmitter and data packet signal generator are understood for the purpose of this application to be synonymous.

BACKGROUND OF THE INVENTION

In order to ensure the best possible performance of a transmitter or data packet signal generator in a modern communication system, testing would typically be required to ensure that the transmitter output power setting is close to or at an optimal performance. Performance usually includes many parameters like output power, phase noise, IQ mismatch, spurious transmissions, etc. Often all modulation quality parameters (e.g. phase noise, IQ mismatch, and the like) are combined into a single value representing all of the transmitter impairments (including noise impairment), the single value known as the error vector magnitude (EVM). The EVM represents how far the measured transmitter constellation is from the ideal constellation.

EVM can be measured in dB or %, where $EVMdb=20*LOG_{10}$ (evm%/100). Different standards may define different requirements on how EVM is measured, but the basis of the measurement is usually the same. Looking at the transmitter specifications, some requirements relate to regulatory specifications, and other requirements relate more directly to transmitter performance.

The regulatory specifications include maximum transmitted power (usually specified at peak and/or at average) as well as spurious transmission (spurious power generated away from the desired frequency spectrum). These parameters are typically tested during regulatory compliance by making measurements using a power meter and a spectrum analyzer. Sufficient margins may be chosen to guard against reaching the regulatory limits such that limited testing may only be needed during production testing. Testing for compliance to regulatory limits may be very time consuming.

Transmitter performance is usually defined by two parameters, the output power and the modulation accuracy (measured by EVM). Typically, the highest output power with the best possible EVM is desired. However, EVM and output power are somewhat correlated such that when the transmitter or data packet signal generator starts to experience compression from increased power, the EVM normally increases (becomes worse). A trade off is usually needed to reach a close to optimal performance.

In older, less modern systems, higher transmit power could usually be applied to yield better performance until the spectral requirements limit would be reached, the spectral requirements being the limiting factor in increasing the power. However, with modern communication systems, the EVM begins to degrade much sooner with the increase of power, and EVM may become a limiting factor sooner than spectral requirements as power is increased.

Typically, EVM is good for low power, and as the power increases the EVM gradually becomes worse. If the EVM is too good, the system performance is dominated by noise at the receiver (e.g. the signal to noise ratio (SNR) is too close to the theoretical SNR limit). As more power is added, better system performance is obtained until the EVM becomes so bad that the system will simply stop functioning with the smallest amount of interference. Accordingly, an optimal EVM level exists where overall system performance is acceptable for the increased power output, and further increase in power output decreases the performance due to the worsening EVM value.

Traditionally, EVM has been difficult to measure, as well as time consuming, compared to traditional power measurements. Typically, the output power of a device has been calibrated to a value that ensures the EVM meeting the EVM requirement. However, in this case, output power is chosen low enough so that all devices can be guaranteed to pass the EVM specification or target EVM. As a result, calibration of transmitters has been non-optimal.

Ideally, a combined EVM and power calibration should be performed, where EVM is adjusted to the desired limit or target EVM by increasing the output power until the EVM target limit is met or the maximum power is reached as allowed by regulatory requirements. In this way, adjusting for optimal performance for all devices would be done instead of ensuring the output power of all devices is constant.

However, EVM is a time consuming measurement. As EVM is a number including all impairments to the transmitted signal, EVM also includes noise, and so a single repeated measurement of a signal will not yield a constant EVM. The EVM will exhibit some statistical variation. Thus, multiple measurements at a given output power level may be needed to establish an averaged or true EVM (EVM averaging). Also, calculating EVM is a computationally intensive operation compared to traditional power measurement. As a consequence, increased test time may be needed to calibrate each transmitter due to the multiple measurements needed for each true EVM measurement point, and the number of EVM measurement points needed to establish calibration at the target EVM level.

In view of the above, improvements are needed to determine a time efficient manner for calibration of a transmitter or data packet signal generator to a more optimal performance based on EVM and output power level.

SUMMARY OF THE INVENTION

A method for estimating and measuring error vector magnitude (EVM) is provided by correlating transmitter compression level to EVM. EVM is estimated based on a linear relationship between EVM and transmitter compression level in the region of interest when transmitter compression becomes a significant contributor to EVM. Complementary cumulative distribution function (CCDF) curves are produced for received test data packet signals, and used to measure transmitter compression level to which an EVM is correlated. Compression level of a transmitter may be measured by dB values obtained, for example, from projecting onto the dB axis (X-axis) of a CCDF chart the intersection points of computed CCDF curves with the ideal or predetermined CCDF curve shifted X dB (e.g. 1 dB) leftwards on the X-axis. Other methods for determining compression level from CCDF curves may be provided. By measuring compression levels in order to estimate correlated EVM values, instead of measuring EVM directly, many iterative adjustments in output power level can be made in a time efficient manner to bring the transmitter EVM close to the desired target EVM for a more optimal transmitter performance.

In one embodiment, a method is provided for measuring an error vector magnitude (EVM) of a signal produced by a data packet signal generator for obtaining a more optimal calibration of the data packet signal generator, comprising: receiving at least one of a first plurality of data packet signals transmitted at an initial predetermined output power level by the data packet signal generator; estimating an initial compression level for the at least one of the received first plurality of data packet signals based on an initial EVM measurement and fixed EVM contributors; and adjusting iteratively the initial compression level to a final adjusted compression level substantially at a predetermined target compression level.

In another embodiment, a method is provided for measuring an error vector magnitude (EVM) of a signal produced by a data packet signal generator for obtaining a more optimal calibration of the data packet signal generator, comprising: receiving at least one of a first plurality of data packet signals transmitted at an initial predetermined output power level by the data packet signal generator, the initial predetermined output power level chosen at an expected power level associated with the predetermined target compression level; computing an initial compression level for the at least one of the received first plurality of data packet signals, and, for iteration purposes, considering the initial compression level to be a next compression level and the initial predetermined output power level to be a next output power level; and adjusting iteratively the next compression level to a final adjusted compression level substantially at a predetermined target compression level.

BRIEF DESCRIPTION OF THE DRAWINGS

The invention will be more readily understood in view of the following description when accompanied by the below figures and wherein like reference numerals represent like elements.

DETAILED DESCRIPTION OF THE INVENTION

Figure 1:
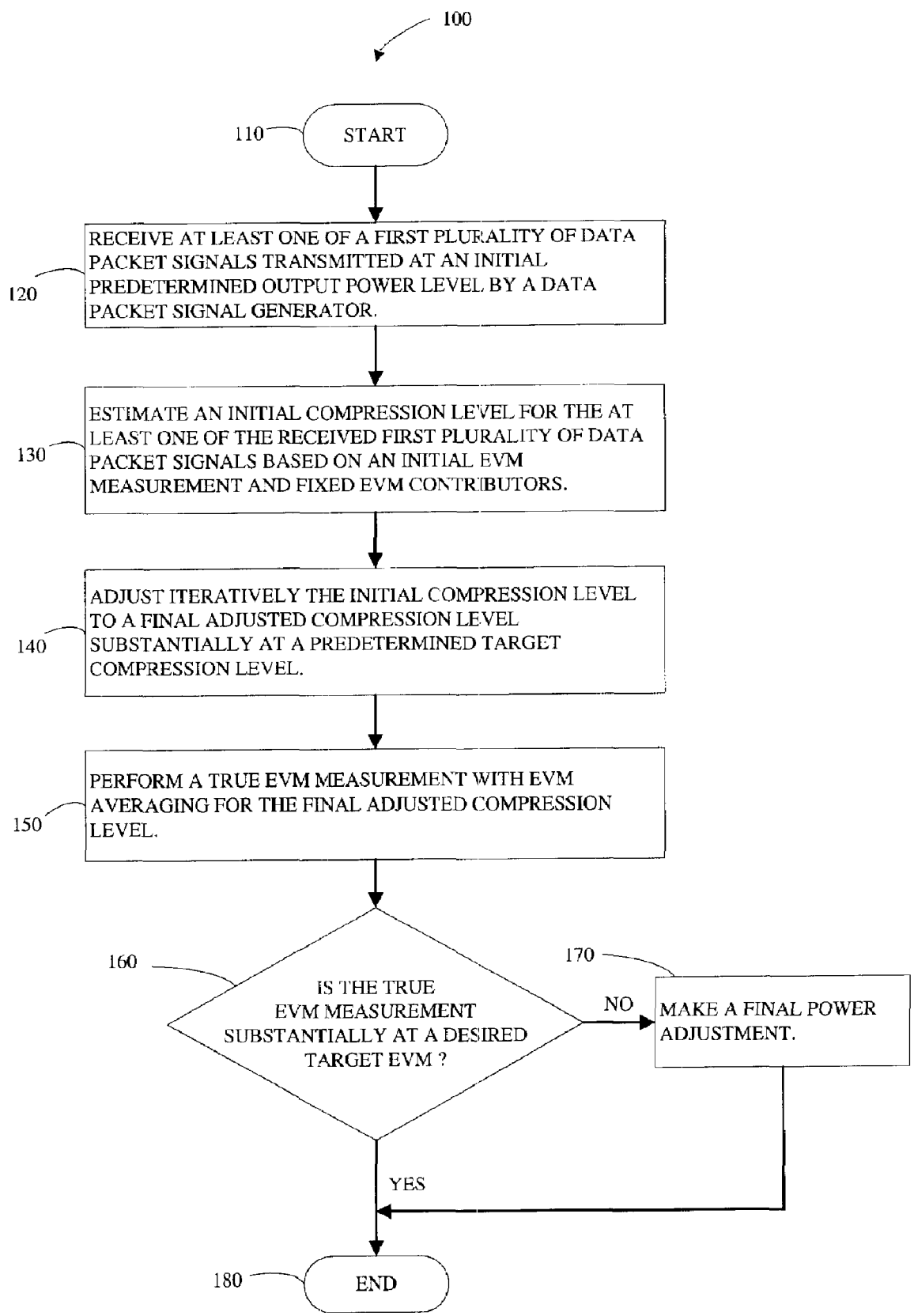
FIG. 1 illustrates a flowchart describing an example of a method in accordance with one embodiment of the presently claimed invention for efficiently measuring an error vector magnitude (EVM) of a signal produced by a data packet signal generator for obtaining a more optimal calibration of the data packet signal generator.

A method is disclosed herein for calibrating a more optimal transmitter performance based on EVM and output power level. A high level flowchart describing an example embodiment of the method is provided by FIG. 1. Figures directly following FIG. 1 illustrate useful information in understanding and expanding the details of FIG. 1. For example, as described herein, a linear relationship exists between EVM and transmitter compression when transmitter compression becomes the dominant contributor to EVM. The linear relationship may be made use of by adjusting power output level of the transmitter to make adjustments in compression level values toward a target compression level, the target compression level corresponding to a target EVM chosen for calibration of the transmitter.

FIG. 1 illustrates a flowchart describing an example of a method 100 for efficiently measuring an error vector magnitude (EVM) of a signal produced by a data packet signal generator for obtaining a more optimal calibration of the data packet signal generator. The method 100 begins at the block 110 at which at least one of a first plurality of data packet signals is transmitted at an initial predetermined output power level by a data packet signal generator. At block 120 the at least one of the first plurality of data packet signals is received as transmitted at the initial predetermined output power level. The initial predetermined output power level at which the first plurality of data packet signals is transmitted is chosen at a low enough output power level such that only a low amount of transmitter compression would result.

At block 130 an initial compression level is estimated for the at least one of the received first plurality of data packet signals based on an initial EVM measurement and fixed EVM contributors. A quick EVM measurement may be performed on the received first plurality of data packet signals to obtain an initial EVM measurement. The initial EVM measurement is done quickly in that no EVM averaging is performed. Since EVM averaging is required for an accurate EVM measurement, the measured initial EVM is done just to obtain a quick approximation to help determine a starting point or initial compression level. Using the received first plurality of data packet signals, fixed components of EVM such as phase noise and IQ mismatch are estimated. Typically, the fixed components do not vary as power output level is increased and the transmitter becomes compressed. The estimated fixed components of EVM are subtracted from the initial EVM measurement to obtain an initial compression-related EVM portion. A graph, showing the linear relationship between EVM and compression level, such as the graph of FIG. 3 to be later described, may be used with the initial compression-related EVM portion to obtain the corresponding initial compression level. In this manner the starting initial compression level may be estimated.

At block 140 the initial compression level is iteratively adjusted to a final adjusted compression level, the final adjusted compression level substantially at a predetermined target compression level or with an output power level that cannot be adjusted higher without exceeding a predetermined (e.g. regulatory limited) maximum output power level. An iterative adjustment is not performed if a subsequent next output power level would become greater than a predetermined maximum output power level. The details of this block 140 are described in the flow chart of FIG. 6 to be addressed later herein. The predetermined target compression level corresponds to the target EVM chosen or desired for calibration, the predetermined target compression level being determined from a pre-constructed linear graph (to be discussed when addressing FIG. 3) relating EVM and compression level. The final adjusted compression level is substantially at the predetermined target compression level when an absolute value of a difference between the final adjusted compression level and the predetermined target compression level is less than a predetermined compression difference amount.

At block 150, a true EVM measurement with EVM averaging is performed for the final adjusted compression level found from block 140. At block 160 the true EVM measurement is compared to the expected or desired target EVM. If the absolute value of a difference between the true EVM measurement and the expected or desired target EVM is greater than a predetermined EVM difference amount, then at block 170 a power adjustment is made and processing flows to block 180. If the absolute value of the difference is not greater than a predetermined EVM difference amount, processing then flows from block 160 to block 180. At block 180, the method 100 ends.

Figure 2:
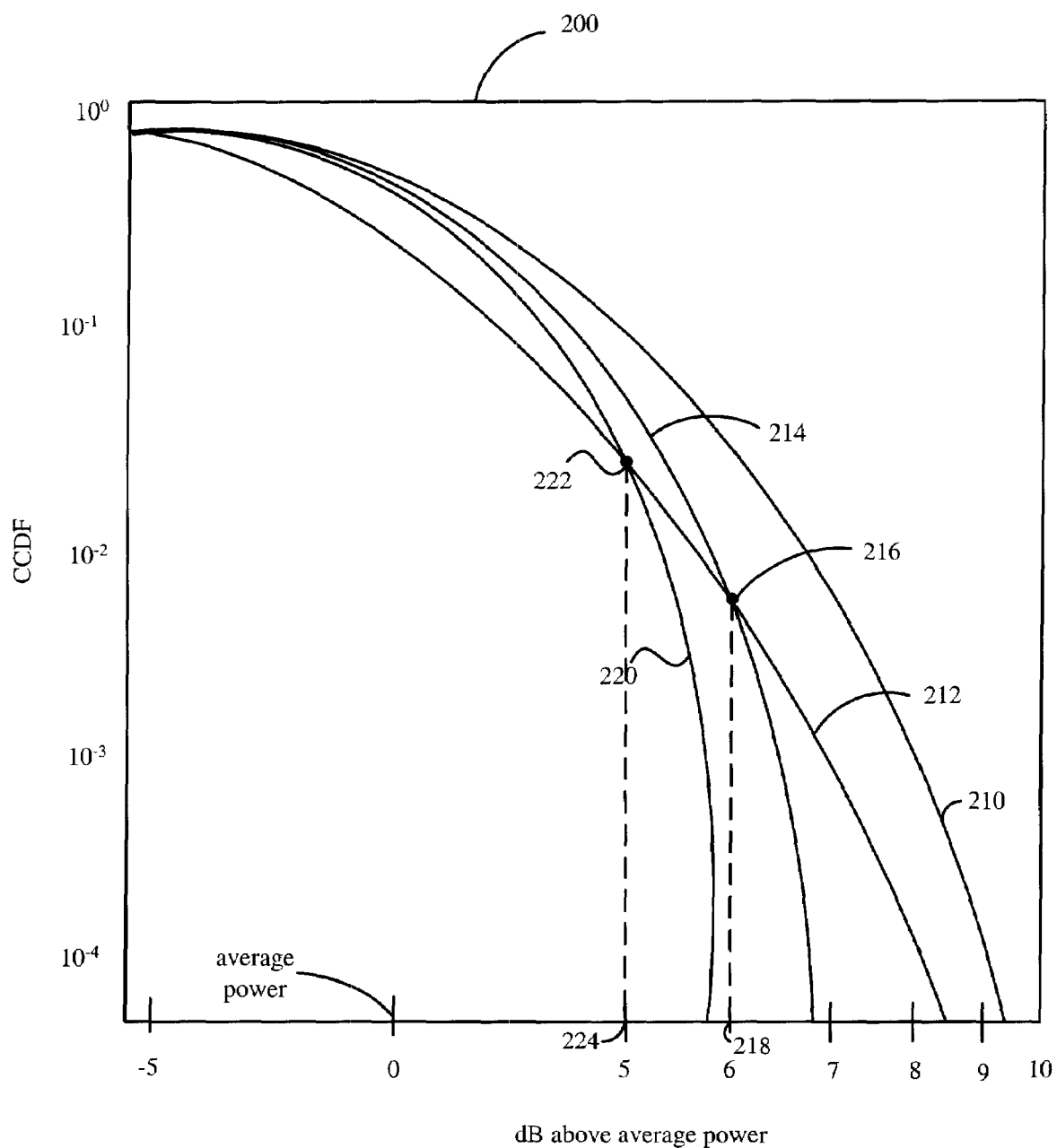
FIG. 2 illustrates a graph of complementary cumulative distribution function (CCDF) curves.

FIG. 2 illustrates a graph 200 showing complementary cumulative distribution function (CCDF) curves. The complimentary cumulative distribution function (CCDF) represents the probability of the transmitted signal, e.g. the transmitted plurality of data packet signals, being X dB or greater than the average power of the signal. The CCDF curve is a simple curve to produce and involves about the same complexity to calculate as calculating the output power level of the captured signal. In FIG. 2 a theoretical/ideal distribution or predetermined CCDF curve 210 is shown and represents quite closely a CCDF curve computed from a plurality of data packet signals transmitted at a low output power level where very little transmitter compression exists. The points on the ideal CCDF curve 210 are shifted leftwards the same dB amount to produce a left-shifted ideal CCDF curve 212. In the example of FIG. 2, the CCDF curve 212 is left-shifted 1 dB, that is, each point on the ideal CCDF curve 210 is left-shifted 1 dB to produce the left-shifted ideal CCDF curve 212. Shown in FIG. 2 is the computed CCDF curve 214 computed for a plurality of data packet signals transmitted at an output power level where compression is becoming evident. For example, the computed CCDF curve 214 is shown intersecting the X-axis at approximately 6.6 or 6.7 dB, and thus intersects the X-axis at about 3 dB left of where the ideal CCDF curve 210 intersects the X-axis. As the output power level is increased for a transmitted plurality of data packet signals, the transmitter compression will become more significant, and may be seen in a computed CCDF curve 214 whose intersection with the X-axis moves leftward as transmitter compression increases.

A X dB left-shifted ideal CCDF curve, e.g. the 1 dB left-shifted ideal CCDF curve 212, may be used to track the changing compression level of a transmitter as the output power level of the transmitter is increased. For example, in FIG. 2 the computed CCDF curve 214 intersects the 1 dB left-shifted ideal CCDF curve 212 at the intersect point 216. The intersect point 216 may be projected downward onto the X-axis to intersect the X-axis at the projected intersect point 218. The projected intersect point will move leftwards along the X-axis for computed CCDF curves as the output power level is increased and may be used as a measurement of compression of the transmitter. For example, the computed CCDF curve 220 is at a higher output power level than the output power level for the computed CCDF curve 214 and the intersect point 222 of the computed CCDF curve 220 with the left-shifted ideal CCDF curve 212 is projected onto the projected intersect point 224, which is shown on the X-axis as being about 5 dB. Thus the projected intersect points 218 and 224 corresponding to the computed CCDF curves 214 and 220 show a change in dB value from about 6 dB to about 5 dB on the X-axis. As the output power level of the transmitter is increased and more computed CCDF curves are produced, the values of the projected intersect points move closer to the dB value of 0 on the X-axis.

Figure 3:
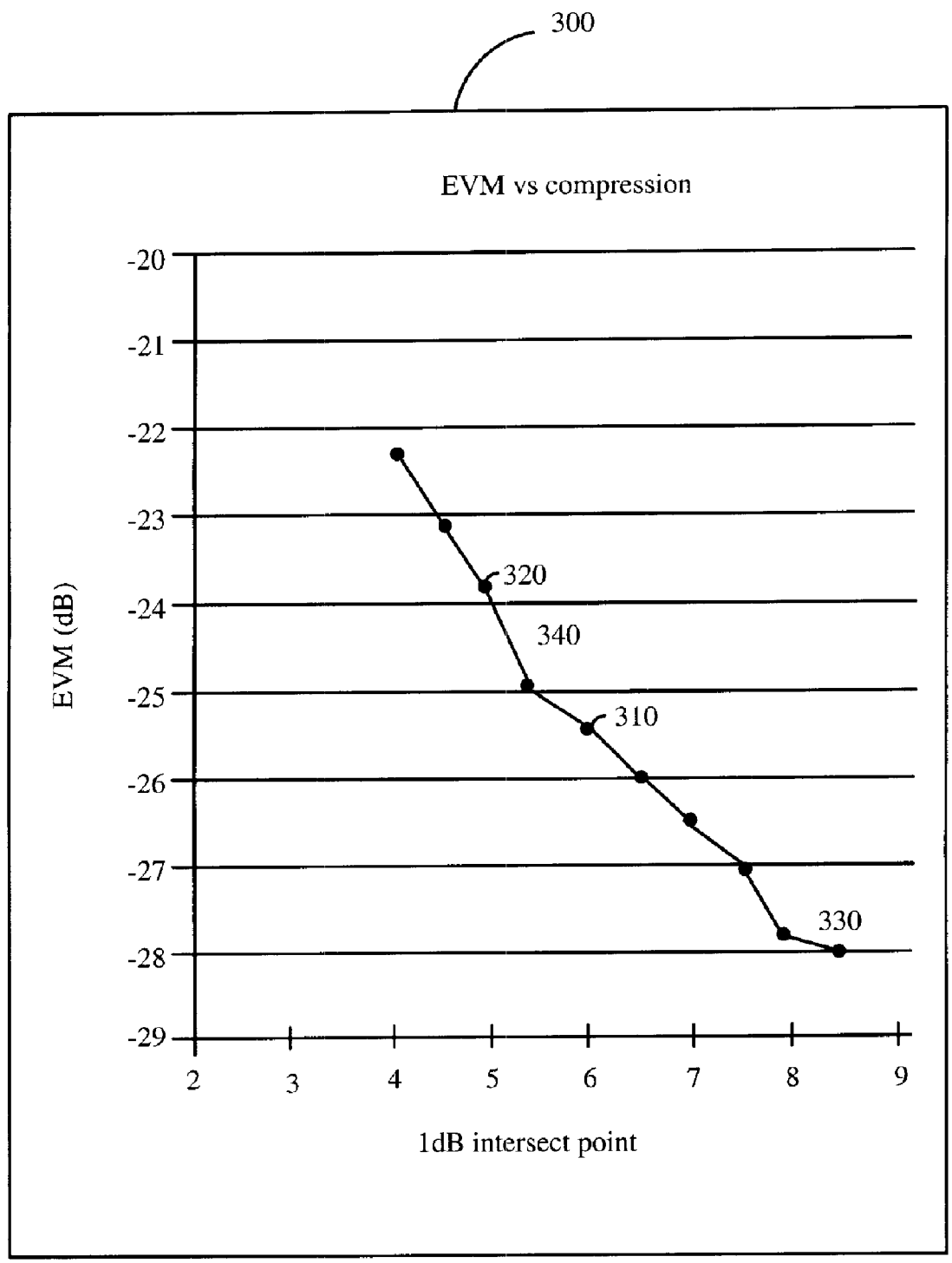
FIG. 3 illustrates a graph showing an example plot of EVM(dB) versus compression level, compression level expressed as 1 dB intersect point dB values.

FIG. 3 illustrates a graph 300 showing an example plot of EVM(dB) versus compression level, compression level expressed as 1 dB intersect point dB values. The points plotted in the graph 300 of FIG. 3 correspond to the projected 1 dB intersect points of FIG. 2. For example, point 310 corresponds to the projected 1 dB intersect point 218 and point 320 corresponds to the projected 1 dB intersect point 224. The Y-axis of FIG. 3 provides the true EVM measured for the related plotted points. Thus the plotted point 310 corresponds to an EVM of about −25.4, and the plotted point 320 corresponds to an EVM of about −23.9. When the compression level of the transmitter is small, e.g. in the graph area 330 of the graph 300, the EVM is dominated by fixed EVM contributors like phase noise, IQ mismatch, etc. However, as the compression of the transmitter increases with increasing output power level, the EVM and the compression start to exhibit a linear relationship as shown in the graph area 340 of the graph 300. A preconstructed graph showing the linear relationship between EVM and compression of the transmitter may be used in calibrating the transmitter. For example, suppose a target EVM of −26 dB is chosen as the desired target EVM, e.g. is the EVM value associated with a close to optimal performing transmitter. According to FIG. 3, an EVM of −26 corresponds to a compression on the X-axis of about 6.5 dB. Thus, 6.5 dB may be chosen as a target compression level to adjust an initial compression level towards in attempting to find the output power level that corresponds to an EVM of −26 dB. By adjusting the output power level of the transmitter such that the measured compression level approaches the 6.5 dB value, the corresponding EVM value should approach the desired target EVM of −26 dB. In this manner, a linear graph relating EVM to compression level, such as the graph 300 of FIG. 3, may be used as part of an iterative algorithm to calibrate a transmitter to an output power level closely associated with a desired target EVM. The deviation from perfect linearity in FIG. 3 is caused by statistical variation of the measured true EVM, statistical variation mainly originating from the fixed contributors to EVM when transmitter compression is very low or nonexistent.

Figure 4:
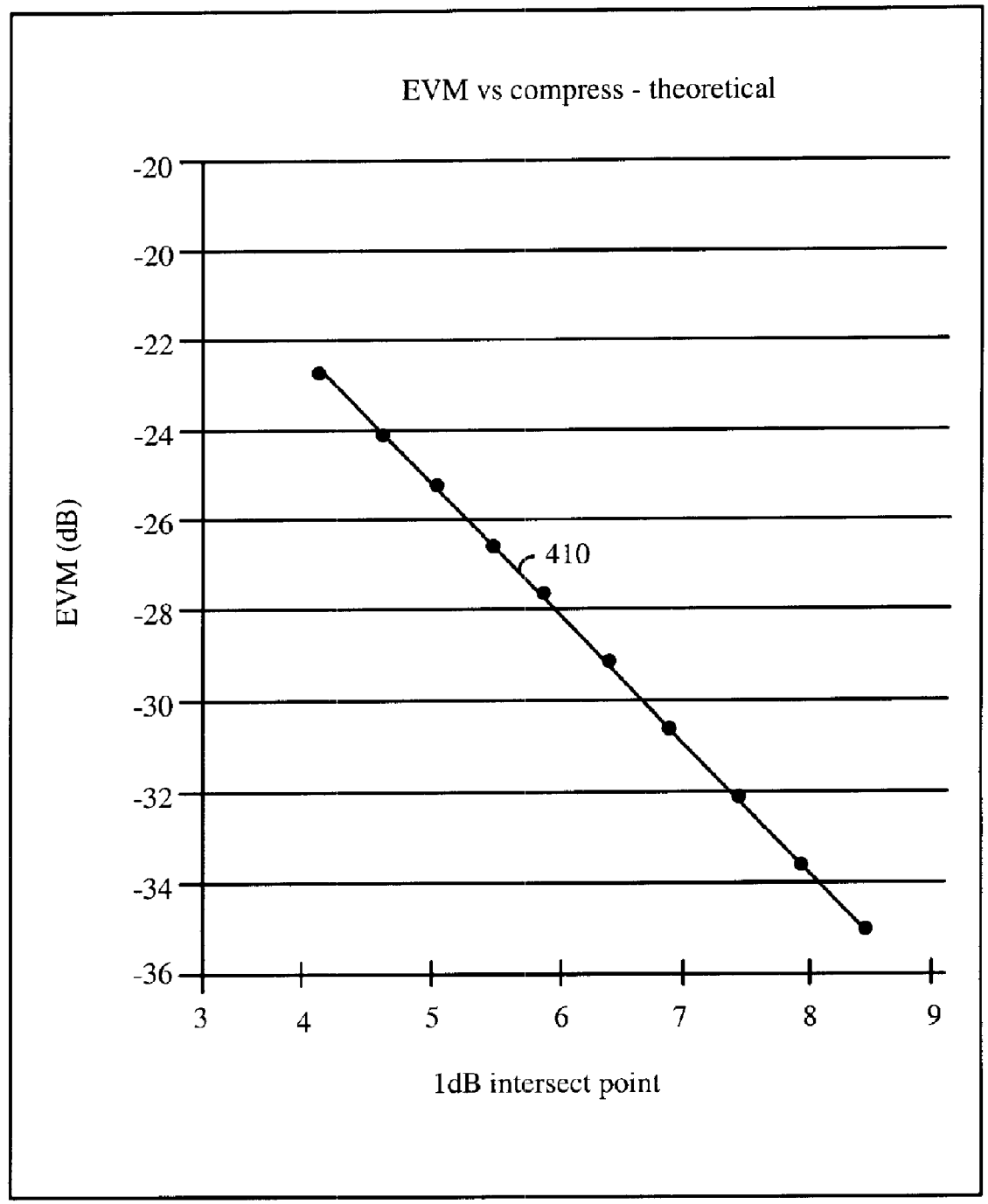
FIG. 4 illustrates the example plot of FIG. 3 simulated to have EVM values with compression as the only contributor to EVM.

FIG. 4 illustrates the example plot of FIG. 3 simulated to have EVM values with compression as the only contributor to EVM. Without the fixed contributors to EVM, the curve 410 of FIG. 4 appears to be quite linear. The curve 410 is slightly lower than the EVM curve of FIG. 3 due to remaining EVM contributors causing this shift in EVM. However, it should be clear from the simulated curve 410 that CCDF curves can be used to correlate compression to EVM.

As mentioned previously, EVM is not a fixed number and typically multiple measurements are required to obtain the measured true EVM for a given transmitter device. Similarly, CCDF curves vary slightly with the data contents and absolute phase (peaking will depend on both) of the received plurality of data packet signals. Thus, it is suggested that the data packet signals have the same data contents from measurement to measurement for measuring a true EVM value. Furthermore, one can easily average the CCDF results much like the EVM results to get a better estimate for the compression and thus for the EVM. Additionally, the compression intersect point may be calculated for multiple compression levels, e.g. for multiple X dB left-shifted CCDF curves of the ideal CCDF curve, from the captured signal. There may be only minimal overhead in calculating the compression intersect point for multiple compression levels as the CCDF curve is monotonous, and once finding the first intersect point, finding other compression level intersect points should be fairly straight-forward using the first found intersect point. Obtaining the compression intersect point for a large or extreme number of compression levels is essentially equal to finding a best fit for an EVM value, but at the expense of additional calculations.

Figure 5:
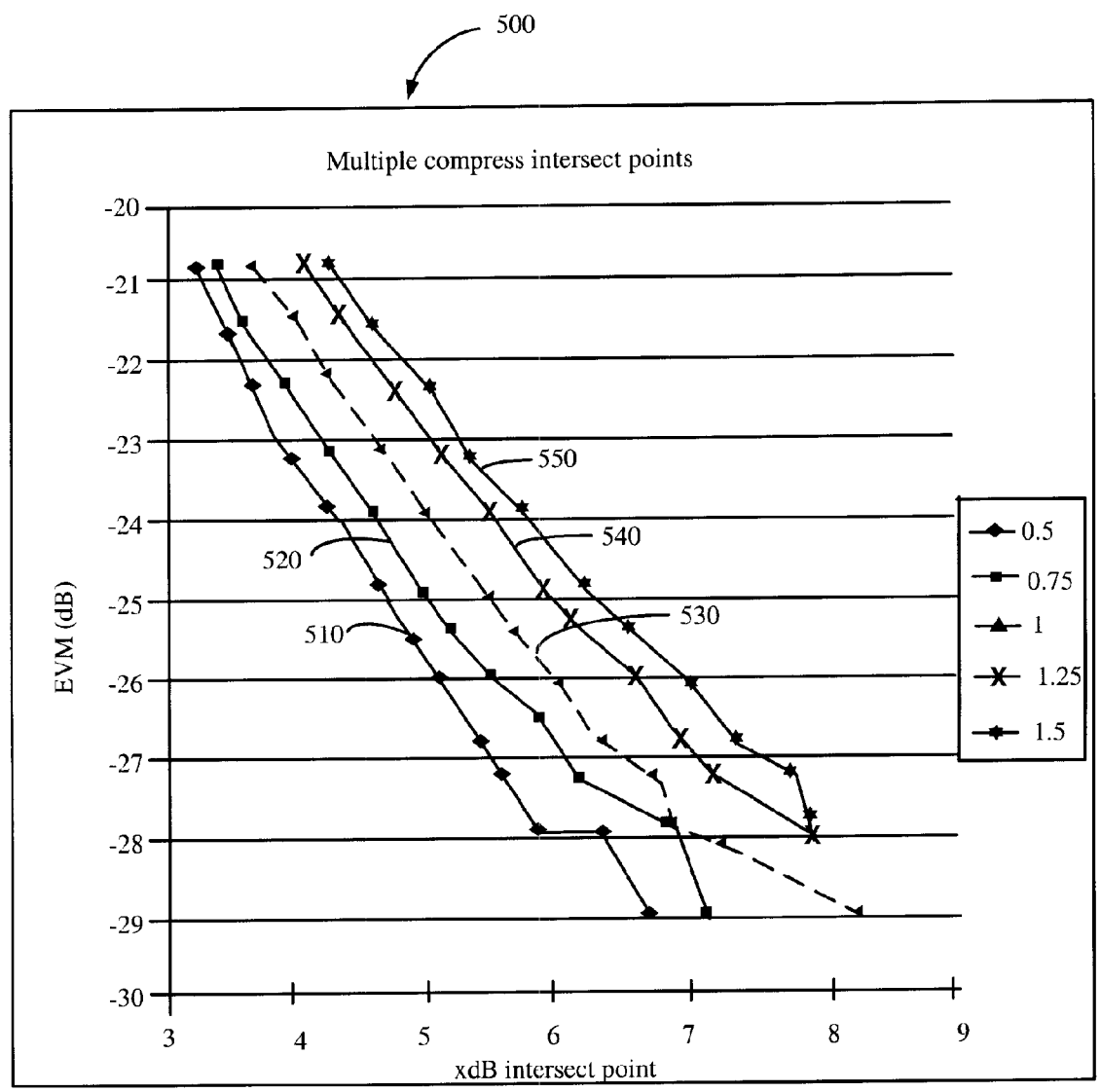
FIG. 5 illustrates a graph showing an example of multiple plots of EVM(dB) versus compression level, compression level expressed as X dB intersect point dB values, where X is allowed to be 0.5, 0.75, 1, 1.25, and 1.5.

FIG. 5 illustrates a graph 500 showing an example of multiple plots or curves of EVM(dB) versus compression level. Compression level is expressed as dB values of projected X dB intersect points, where values of X are chosen at 0.5, 0.75, 1, 1.25, and 1.5 to correspond to the plots or curves 510, 520, 530, 540 and 550.

By measuring multiple X dB intersect points for each received plurality of data packets signals, a CCDF curve fit may be obtained and a more accurate EVM estimate may be found with minimal extra calculations. For example, for a given output power level and corresponding received plurality of data packet signals, the values of the curves 510, 520, 530, 540 and 550 may be used to locate a curve fit point. This curve fitting likewise may be done for each transmitted plurality of data packet signals transmitted at various output power levels. In this manner, a curve fit may be found for the curves 510, 520, 530, 540 and 550. Naturally, this process could be taken to the extreme by performing a best curve fit for many more curves in addition to curves 510, 520, 530, 540 and 550, and from the best curve fit the EVM could be estimated.

More variation is shown in the curves 510, 520, 530, 540 and 550 at lower EVM levels. This variation may be due to the compression not being the dominant source of EVM at the associated output power levels. Naturally, multiple measurements could be used to obtain an even better average of the compression—thus better estimate to the EVM.

Figure 6:
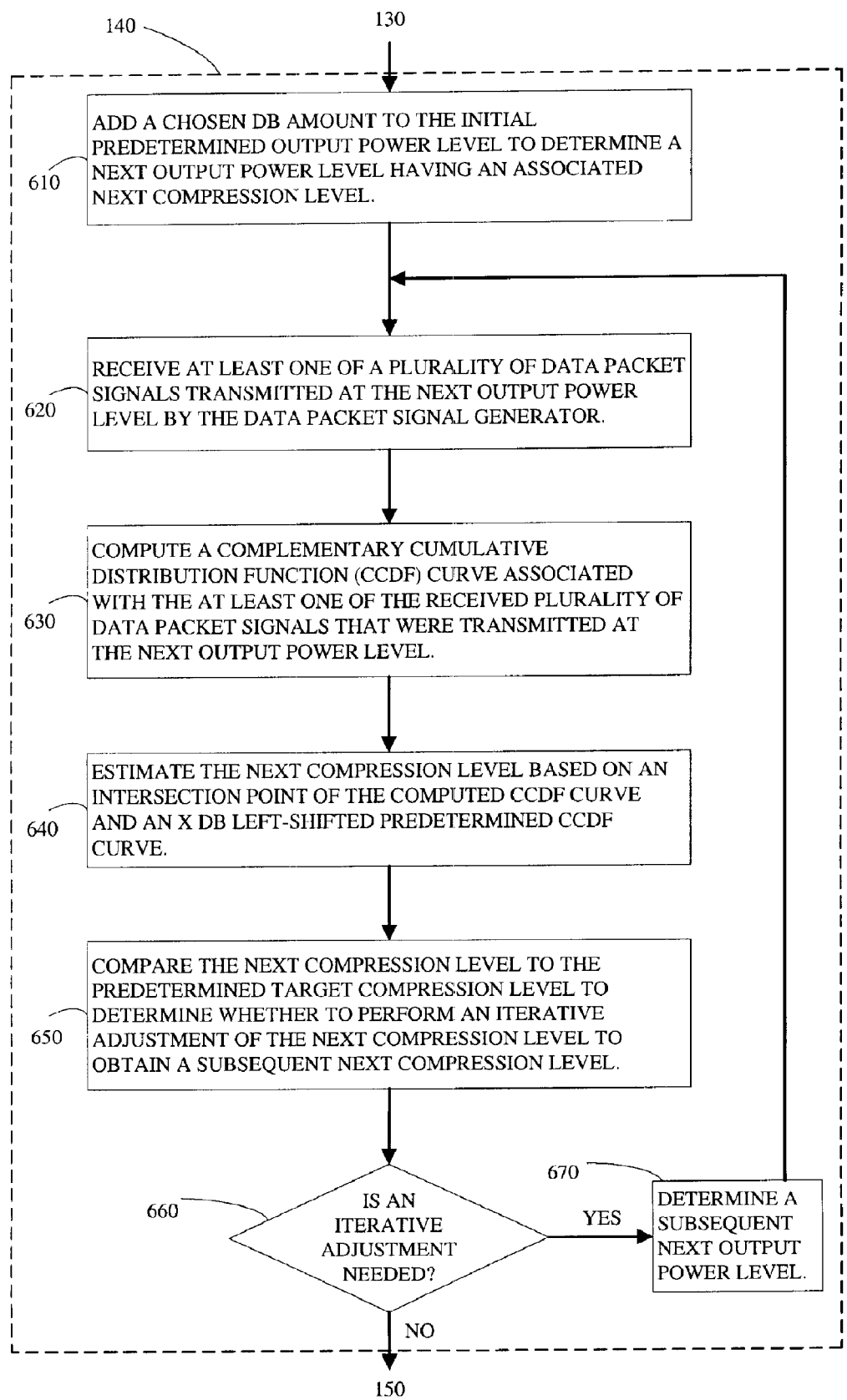
FIG. 6 illustrates a block of the flowchart of FIG. 1 expanded to show details comprising the adjusting iteratively of an initial compression level to a final adjusted compression level.

FIG. 6 illustrates a block 140 of the flowchart of FIG. 1 expanded to show details comprising the adjusting iteratively of an initial compression level to a final adjusted compression level. At block 610 a predetermined power increase is added to the initial predetermined output power level to determine a next output power level having an associated next compression level. Unless compression characteristics are well known for the transmitter, the predetermined power increase may be selected as the difference between the initial compression level and the predetermined target compression level. At block 620 at least one of a plurality of data packet signals is received as transmitted by the data packet signal generator at the next output power level. At block 630 a CCDF curve is computed for the at least one of the received plurality of data packet signals that were transmitted at the next output power level. At block 640 the next compression level is estimated based on at least one intersection point of the computed CCDF curve and at least one X dB left-shifted predetermined CCDF curve. In the extreme case of a large number of X dB left-shifted predetermined CCDF curves, the estimation of the next compression level will become a best curve fit that fits to the actual compression curve the best. At block 650 the next compression level is compared to the predetermined target compression level corresponding to the expected or desired target EVM level to determine whether to perform an iterative adjustment of the next compression level to obtain a subsequent next compression level. Based on this comparison, at block 660 a decision is made as to whether an iterative adjustment is needed. An iterative adjustment is determined if an absolute value of a difference between the next compression level and the predetermined target compression level is greater than a predetermined compression difference amount and a subsequent next output power level corresponding to the subsequent next compression level does not exceed a predetermined maximum output power level.

Assuming an iterative adjustment is needed, at block 670 a subsequent next output power level is determined as follows. If the next compression level is less than the predetermined target compression level, the next output power level is adjusted upwards to a subsequent next output power level by adding to the next output power level an absolute difference between the predetermined target compression and the next compression levels. Alternatively, if the next compression level is greater than the predetermined target compression level, the next output power level is adjusted downwards to a subsequent next output power level by subtracting from the next output power level the absolute difference between the predetermined target compression level and the next compression level. Once a subsequent next output power level is determined at block 670, processing flows to block 620 again where a plurality of data packet signals is received at the subsequent next output power level. The blocks 620, 630, 640, 650, 660, and 670 may be iteratively repeated as many times as needed to bring the final compression level within some margin of the predetermined target compression level. At block 660 if an iterative adjustment is not needed, processing flows to block 150.

Figure 7:
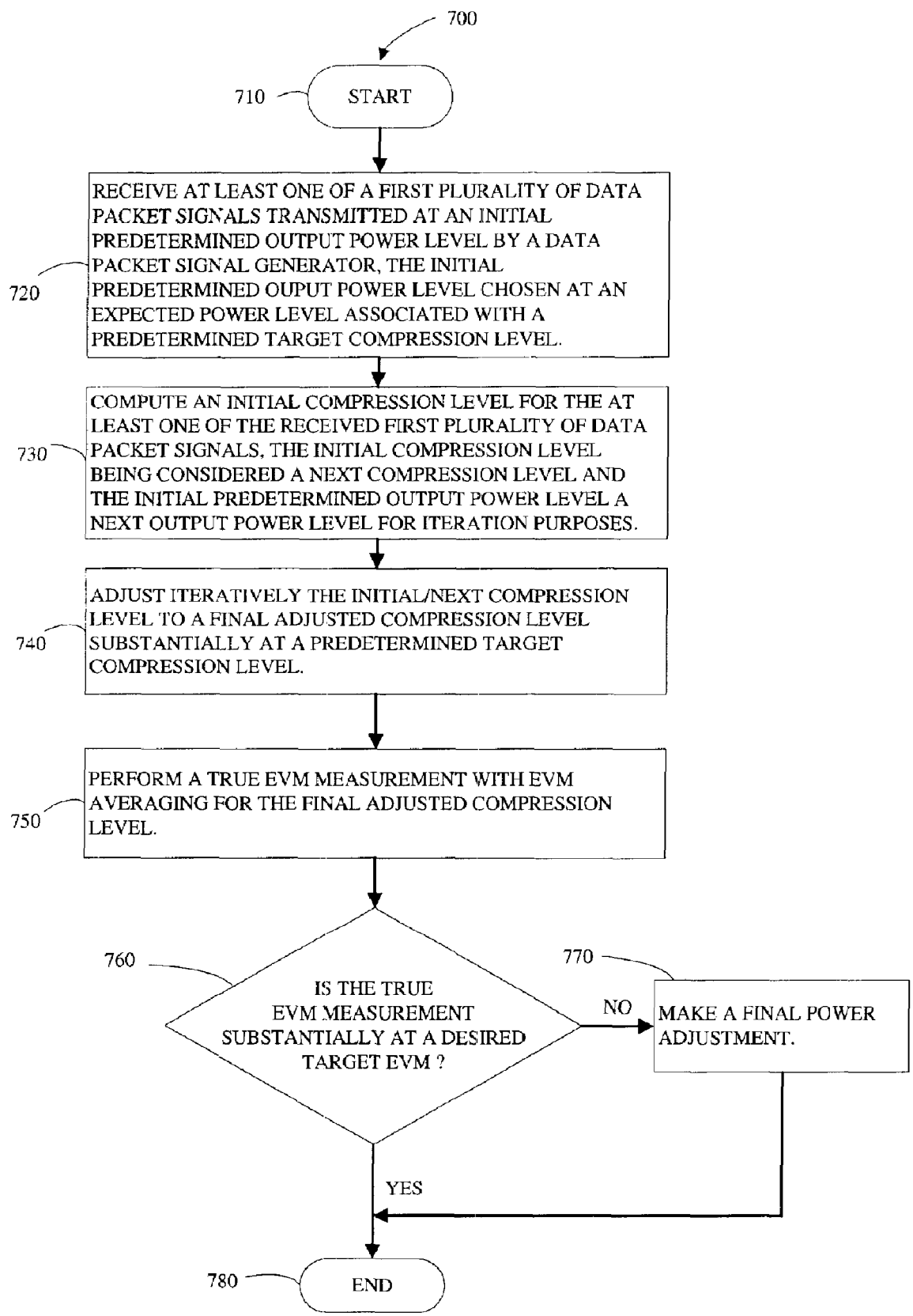
FIG. 7 illustrates an alternative flowchart to the flowchart of FIG. 1, the flowchart of FIG. 7 describing an example of a method in accordance with another embodiment of the presently claimed invention for efficiently measuring an error vector magnitude (EVM) of a signal produced by a data packet signal generator for obtaining a more optimal calibration of the data packet signal generator.

FIG. 7 illustrates an example of an alternative method to the method of the example of FIG. 1. FIG. 7 illustrates a flowchart describing an example of a method 700 for efficiently measuring an error vector magnitude (EVM) of a signal produced by a data packet signal generator for obtaining a more optimal calibration of the data packet signal generator. The method 700 begins at the block 710 at which at least one of a first plurality of data packet signals is transmitted at an initial predetermined output power level by a data packet signal generator. At block 720 the at least one of the first plurality of data packet signals is received as transmitted at the initial predetermined output power level. The initial predetermined output power level is chosen at an expected power level associated with a predetermined target compression level.

At block 730 an initial compression level is computed for the at least one of the received first plurality of data packet signals, the initial compression level being considered a next compression level and the initial predetermined output power level a next output power level for iteration purposes.

At block 740 the initial compression level is iteratively adjusted to a final adjusted compression level, the final adjusted compression level substantially at a predetermined target compression level or with an output power level that cannot be adjusted higher without exceeding a predetermined (e.g. regulatory limited) maximum output power level. An iterative adjustment is not performed if a subsequent next output power level would become greater than a predetermined maximum output power level. The details of the block 740 are described in the flow chart of FIG. 8 to be addressed later herein. The predetermined target compression level corresponds to the target EVM chosen or desired for calibration, the predetermined target compression level being determined from a pre-constructed linear graph, an example shown in FIG. 3, relating EVM and compression level. The final adjusted compression level is substantially at the predetermined target compression level when an absolute value of a difference between the final adjusted compression level and the predetermined target compression level is less than a predetermined compression difference amount.

At block 750, a true EVM measurement with EVM averaging is performed for the final adjusted compression level found from block 740. At block 760 the true EVM measurement is compared to the expected or desired target EVM. If the absolute value of a difference between the true EVM measurement and the expected or desired target EVM is greater than a predetermined EVM difference amount, then at block 770 a power adjustment is made and processing flows to block 780. If the absolute value of the difference is not greater than a predetermined EVM difference amount, processing then flows from block 760 to block 780. At block 780, the method 700 ends.

Figure 8:
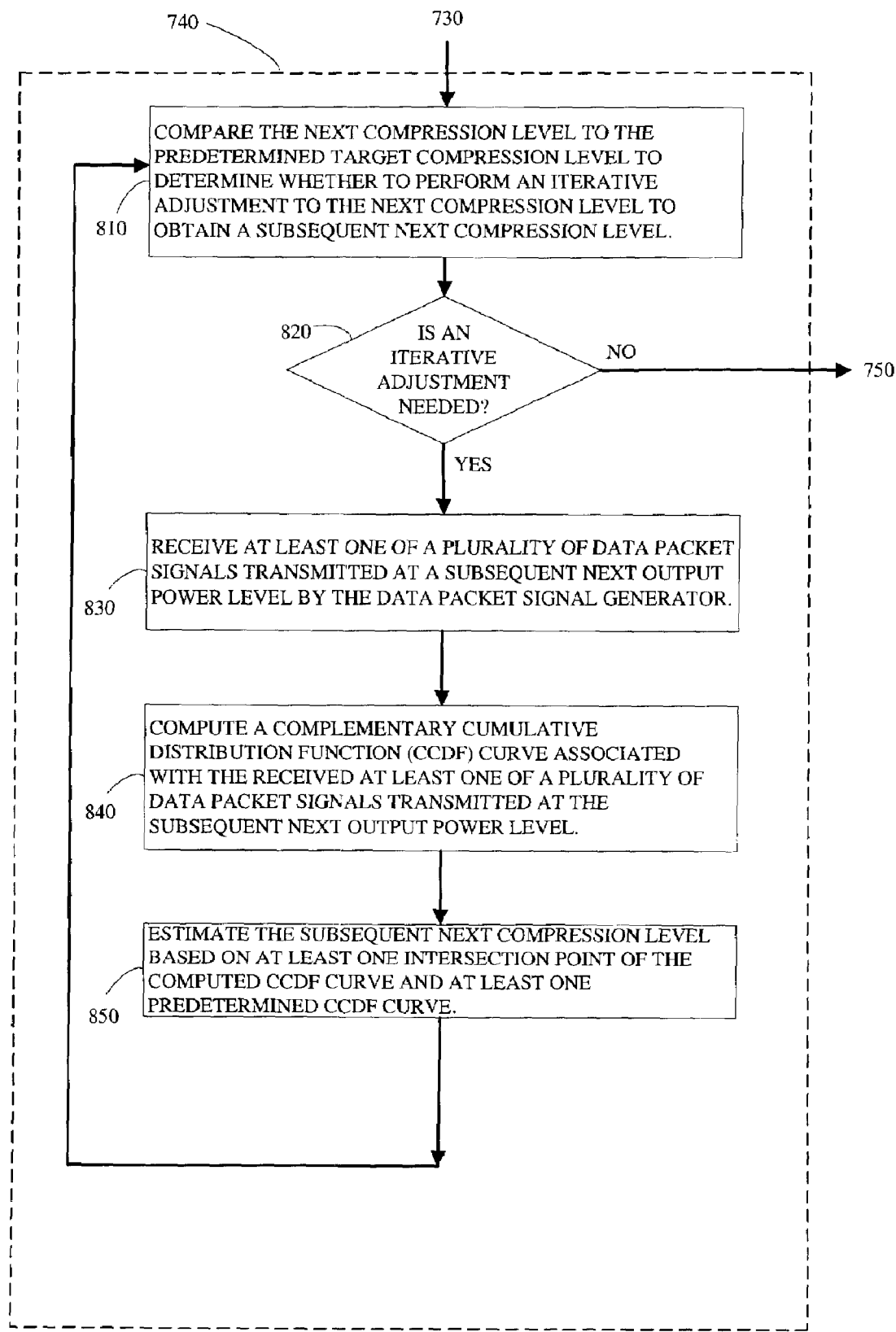
FIG. 8 illustrates a block of the flowchart of FIG. 7 expanded to show details comprising the adjusting iteratively of an initial compression level to a final adjusted compression level.

FIG. 8 illustrates the block 740 of the flowchart of FIG. 7 expanded to show details comprising the adjusting iteratively of the initial compression level (referred to as the next compression level when in the iteration loop) to the final adjusted compression level. At block 810 iteration begins with the next compression level being compared to the predetermined target compression level to determine whether to perform an iterative adjustment to the next compression level to obtain a subsequent next compression level. At block 820, if an iterative adjustment is needed, processing proceeds to block 830, else no further iterative adjustments are needed and processing proceeds to block 750. An iterative adjustment may be determined if an absolute value of a difference between the next compression level and the predetermined target compression level is greater than a predetermined compression difference amount and a subsequent next output power level corresponding to a subsequent next compression level does not exceed a predetermined maximum output power level. At block 830 at least one of a plurality of data packet signals is transmitted by the data packet signal generator at a subsequent next output power level and received. A subsequent next output power level may be determined as determined within the processing of FIG. 6. A CCDF curve is computed at block 840 for the at least one of the received plurality of data packet signals that were transmitted at the subsequent next output power level. At block 850 the subsequent next compression level is estimated based on at least one intersection point of the computed CCDF curve and at least one X dB left-shifted predetermined CCDF curve. In the extreme case of a large number of X dB left-shifted predetermined CCDF curves, the estimation of the next compression level will become a best curve fit that fits to the actual compression curve the best. After block 850, processing proceeds back to the block 810.

Among the many advantages, the embodiments described herein provide a method for calibration of a transmitter or data packet signal generator to a more optimal performance based on EVM and transmitter output power. Test time is not significantly increased over the test time required for traditional calibration based on output power level. An output power level with an EVM that meets a more optimal transmitter performance is found in a time efficient manner. The method makes use of approximating or estimating the EVM value without having to perform a plurality of lengthy EVM averaging measurements. The method is based on a linear relationship between EVM and transmitter compression in the region of interest when transmitter compression becomes a significant contributor to EVM. The relationship is only linear in the region of interest as EVM will become very bad when entering deep compression, for example to the point where signal is decoded to wrong bit values. CCDF curves are produced for received test data packet signals, and used to measure transmitter compression level to which an estimated EVM is correlated. By measuring compression levels to estimate correlated EVM values, instead of measuring EVM directly, many iterative adjustments in output power level can be made to bring the transmitter EVM close to the desired target EVM in a time efficient manner.

The above detailed description of the invention and the examples described therein have been presented for the purposes of illustration and description only and not by limitation. For example, the operations described may be done in any suitable manner. The method steps may be done in any suitable order still providing the described operations and results. It is therefore contemplated that the present invention cover any and all modifications, variations or equivalents that fall within the spirit and scope of the basic underlying principles disclosed above and claimed herein.

What is claimed is:

1. A method for measuring an error vector magnitude (EVM) of a signal produced by a data packet signal generator for obtaining a more optimal calibration of the data packet signal generator, comprising:
    receiving at least one of a first plurality of data packet signals transmitted at an initial predetermined output power level by the data packet signal generator;
    estimating an initial compression level for the at least one of the received first plurality of data packet signals based on an initial EVM measurement and fixed EVM contributors, including
        subtracting from the initial EVM measurement the fixed EVM contributors to obtain an initial compression-related EVM portion,
        comparing the initial compression-related EVM portion to a pre-constructed graph showing EVM versus compression level to estimate an initial compression level; and
    adjusting iteratively the initial compression level to a final adjusted compression level substantially at a predetermined target compression level.

2. The method according to claim 1, further comprising:
    performing a true EVM measurement for the final adjusted compression level;
    comparing the true EVM measurement to an expected EVM target level; and
    making a power adjustment if an absolute difference between the true EVM measurement and the expected EVM target level is greater than a predetermined EVM difference amount.

3. The method according to claim 2, wherein the performing a true EVM measurement includes performing a true EVM measurement with EVM averaging.

4. The method according to claim 1, wherein the fixed EVM contributors include phase noise and IQ mismatch.

5. The method according to claim 1, wherein said adjusting iteratively the initial compression level is discontinued if a subsequent next output power level for transmitting and receiving at least one of a next plurality of data packet signals would become greater than a predetermined maximum output power level.

6. A method for measuring an error vector magnitude (EVM) of a signal produced by a data packet signal generator for obtaining a more optimal calibration of the data packet signal generator, comprising:
    receiving at least one of a first plurality of data packet signals transmitted at an initial predetermined output power level by the data packet signal generator;
    estimating an initial compression level for the at least one of the received first plurality of data packet signals based on an initial EVM measurement and fixed EVM contributors; and
    adjusting iteratively the initial compression level to a final adjusted compression level substantially at a predetermined target compression level, including firstly adding a predetermined power increase to the initial predetermined output power level to determine a next output power level having an associated next compression level, wherein the predetermined power increase is less than an absolute difference between said initial compression level and the predetermined target compression level.

7. The method according to claim 6, wherein said adjusting iteratively said initial compression level further includes:

receiving at least one of a plurality of data packet signals transmitted at said next output power level by the data packet signal generator;

computing a complementary cumulative distribution function (CCDF) curve associated with the at least one of the received plurality of data packet signals transmitted at said next output power level;

estimating said next compression level based on at least one intersection point of the computed CCDF curve and at least one predetermined CCDF curve; and comparing said next compression level to the predetermined target compression level to determine whether to perform an iterative adjustment to said next compression level to obtain a subsequent next compression level.

8. The method according to claim 7, wherein the determining whether to perform the iterative adjustment includes determining to perform the iterative adjustment if an absolute value of a difference between said next compression level and the predetermined target compression level is greater than a predetermined compression difference amount and a subsequent next output power level corresponding to the subsequent next compression level does not exceed a predetermined maximum output power level.

9. The method according to claim 7, wherein when having determined to perform the iterative adjustment to said next compression level, the iterative adjustment is performed by:

adjusting said next output power level upwards if said next compression level is less than the predetermined target compression level, wherein said next output power level is adjusted upwards to a subsequent next output power level by adding to said next output power level an absolute difference between the predetermined target compression level and said next compression level; and adjusting said next output power level downwards if said next compression level is greater than the predetermined target compression level, wherein said next output power level is adjusted downwards to the subsequent next output power level by subtracting from said next output power level the absolute difference between the predetermined target compression level and said next compression level.

10. A method for measuring an error vector magnitude (EVM) of a signal produced by a data packet signal generator for obtaining a more optimal calibration of the data packet signal generator, comprising:

receiving at least one of a first plurality of data packet signals transmitted at an initial predetermined output power level by the data packet signal generator, the initial predetermined output power level chosen at an expected power level associated with the predetermined target compression level;

computing an initial compression level for the at least one of the received first plurality of data packet signals, and, for iteration purposes, considering the initial compression level to be a next compression level and the initial predetermined output power level to be a next output power level; and adjusting iteratively the next compression level to a final adjusted compression level substantially at a predetermined target compression level, including comparing the next compression level to the predetermined target compression level to determine whether to perform an iterative adjustment to the next compression level to obtain a subsequent next compression level, and having determined to perform an iterative adjustment, then receiving at least one of a plurality of data packet signals transmitted at a subsequent next output power level by the data packet signal generator, computing a complementary cumulative distribution function (CCDF) curve associated with the received at least one of a plurality of data packet signals transmitted at the subsequent next output power level, and estimating the subsequent next compression level based on at least one intersection point of the computed CCDF curve and at least one predetermined CCDF curve.

11. The method according to claim 10, wherein the adjusting iteratively the next compression level is discontinued if a subsequent next output power level for transmitting and receiving at least one of a plurality of data packet signals would become greater than a predetermined maximum output power level.

12. The method according to claim 10, wherein the determination is made to perform the iterative adjustment to the next compression level to obtain the subsequent next compression level if an absolute value of a difference between the next compression level and the predetermined target compression level is greater than a predetermined compression difference amount and the subsequent next output power level corresponding to the subsequent next compression level does not exceed a predetermined maximum output power level.

13. The method according to claim 10, wherein when having determined to perform the iterative adjustment to the next compression level to obtain the subsequent next compression level, the iterative adjustment is performed by:

adjusting the next output power level upwards if the next compression level is less than the predetermined target compression level, wherein the next output power level is adjusted upwards to the subsequent next output power level by adding to the next output power level an absolute difference between the predetermined target compression level and said next compression level; and adjusting the next output power level downwards if the next compression level is greater than the predetermined target compression level, wherein the next output power level is adjusted downwards to the subsequent next output power level by subtracting from the next output power level the absolute difference between the predetermined target compression level and said next compression level.

14. The method according to claim 10, further comprising:

performing a true EVM measurement for the final adjusted compression level;

comparing the true EVM measurement to an expected EVM target level; and making a power adjustment if an absolute difference between the true EVM measurement and the expected EVM target level is greater than a predetermined EVM difference amount.

15. The method according to claim 14, wherein the performing a true EVM measurement includes performing a true EVM measurement with EVM averaging.

* * * * *